J. W. McGOWEN.
VEHICLE SPRING.

No. 187,658.  Patented Feb. 20, 1877.

Witnesses:  Inventor:

UNITED STATES PATENT OFFICE.

JAMES W. McGOWEN, OF MARLBOROUGH, NORTH CAROLINA.

IMPROVEMENT IN VEHICLE-SPRINGS.

Specification forming part of Letters Patent No. 187,658, dated February 20, 1877; application filed August 16, 1876.

*To all whom it may concern:*

Be it known that I, JAMES W. McGOWEN, of Marlborough, in the county of Pitt and State of North Carolina, have invented certain new and useful Improvements in Springs for Vehicles; and I do hereby declare that the following is a full, clear, and exact description thereof, which will enable others skilled in the art to which it appertains to make and use the same, reference being had to the accompanying drawings, which form a part of this specification.

This invention relates to certain improvements in vehicle-springs; and it consists in the construction and arrangement of one or more auxiliary springs, combined with an elliptic spring of the ordinary construction, in the manner and for the purpose hereinafter more fully explained.

Figure 1:
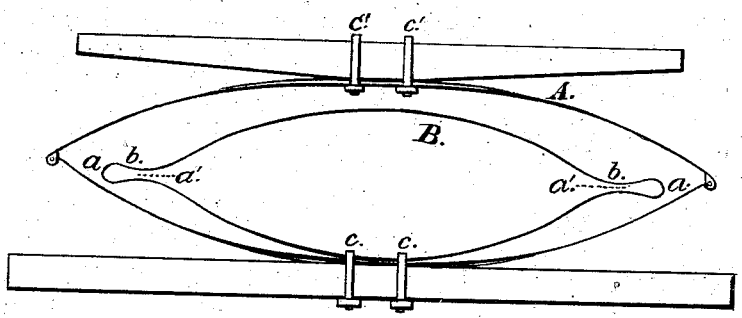
Figure 2:
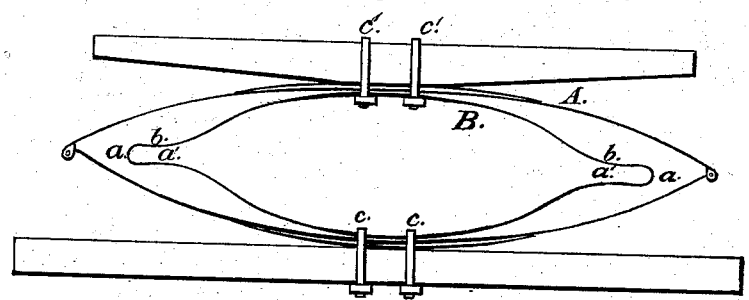
Figure 3:
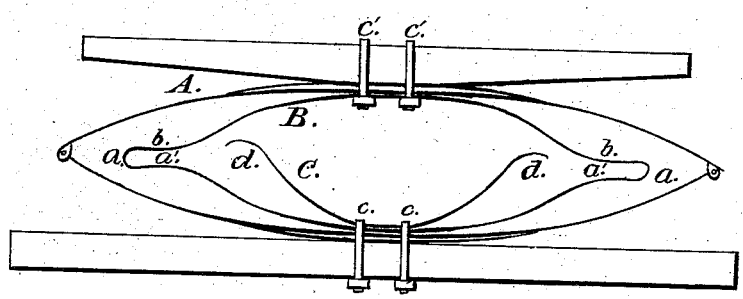

In the drawing, Figures 1 and 2 are side elevations of an elliptic wagon-spring having one auxiliary; and Fig. 3 is a similar view, showing the arrangement and combination, with an ordinary elliptic spring, of two auxiliary springs.

Similar letters of reference indicate corresponding parts in all the figures.

A is the outside spring, which is secured upon the axle or head-block by clips $c$ $c$, in the usual manner. B is an auxiliary spring, made of tempered steel, in one piece or otherwise, so as to be more "giving" or elastic than spring A, and of such a proportion and shape in its relation to spring A that, when secured by the clips $c$ $c$, it will leave an open space between the upper arches of the two springs, as shown in Fig. 1.

When spring B is stretched by being secured to the upper side of spring A by means of the clips $c'$ $c'$, its elongated bent ends will assume the position indicated in Fig. 2—that is, the parts denoted by $b$ $b$, where the spring is bent or doubled, will be parallel, or nearly so, to each other.

By this combination of springs A and B it will be observed that spring B will bear up none of the load until spring A has been pressed down to the position spring B would occupy were it not fastened by the clips $c'$ $c'$, (this position being shown in Fig. 1,) or, in other words, the auxiliary spring B does not come into play until spring A has been depressed to this point. When this has been reached spring B will commence to give at its extreme points $a$; and, when still further depressed, points $a'$ will come in contact with each other, thereby stiffening the spring, and cushioning the outside spring in proportion to the weight of the load and consequent depression of the spring A.

When it is intended to use my improvement on wagons carrying heavy loads, a second auxiliary spring, C, may be inserted within spring B, and kept in place by the clips $c$ $c$, as represented in Fig. 3. This latter consists of a semi-elliptical spring, having curved ends or points $d$ $d$, that, when spring B is depressed, will come in contact with and slide upon the under side of the upper arch of spring B, thereby further cushioning it and the outer spring A, within which both are placed.

By my improvement I entirely obviate the danger of breaking the springs in carrying heavy loads, besides adding to the elasticity of the ordinary elliptic spring, whose rigidity of tension is counteracted by the stretch of the spring B.

The power of resistance of my improved combination-spring will increase in the same proportion as the weight or load is increased; and the arrangement of the springs is such as to secure uniform elasticity on rough roads, whether the load carried be light or heavy.

Having thus described my improvement, I claim and desire to secure by Letters Patent of the United States—

1. The improved combination-spring for vehicles herein described, consisting of an outer elliptical spring, A, in combination with the auxiliary spring B, bent at $a$ and $a'$, and stretched between the clips $c$ $c$ and $c'$ $c'$, by which the outer spring is secured to the running-gear and wagon-bed, substantially as and for the purpose hereinbefore set forth.

2. In combination with the spring A, having the inner auxiliary spring B, constructed as described, the semi-elliptical spring C, bent at $d$ $d$, and arranged within spring B, substantially in the manner and for the purpose hereinbefore set forth.

3. An auxiliary spring, B, for vehicle-springs, consisting of one or more pieces of tempered steel, bent at $a$ and $a'$, substantially as and for the purpose herein shown and specified.

In testimony that I claim the foregoing as my own I have hereto affixed my signature in presence of two witnesses.

JAMES W. McGOWEN.

Witnesses:
W. B. EASTON,
E. O. McGOWEN.